April 13, 1954  C. R. HOLLIS  2,674,978
SPOT PASTING MACHINE
Filed Jan. 17, 1952  4 Sheets-Sheet 1
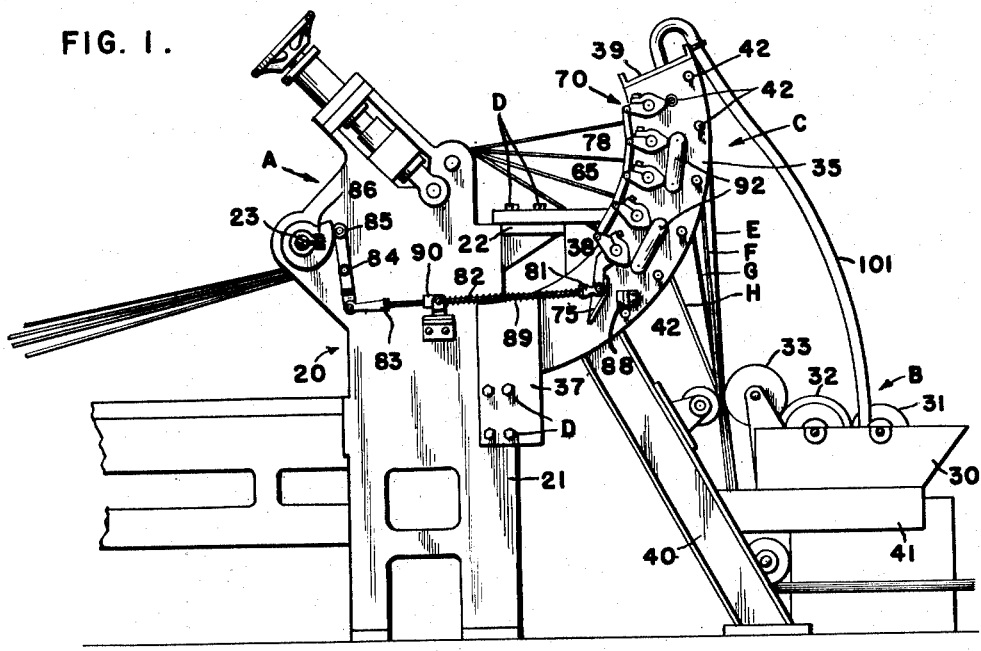
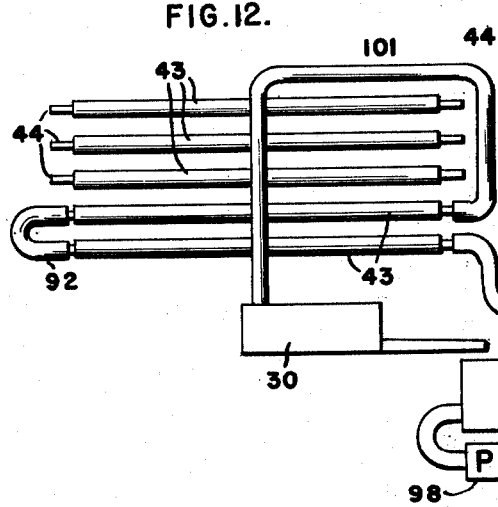
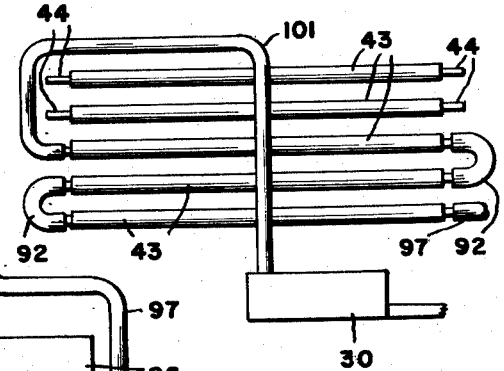
Inventor
CLINTON R. HOLLIS
Attorney

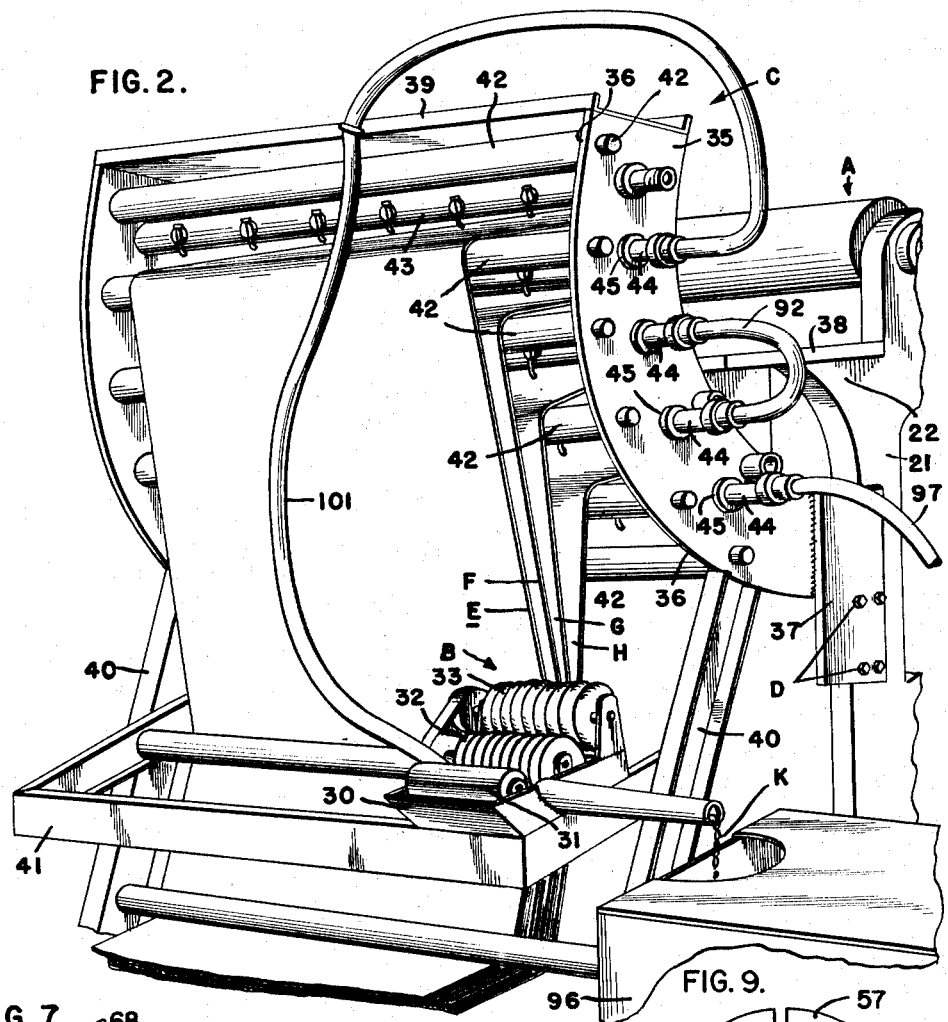
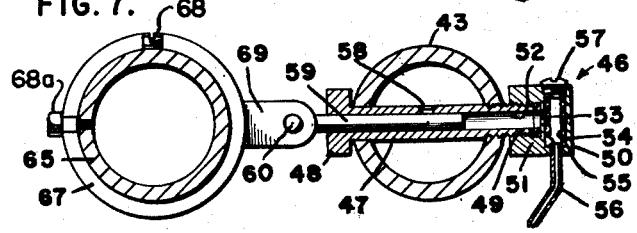
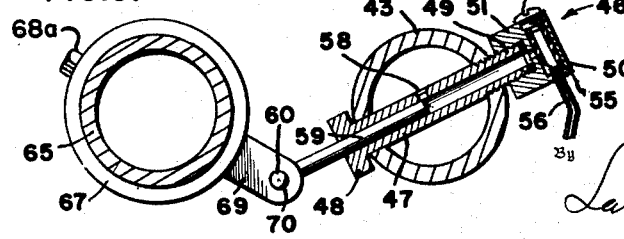
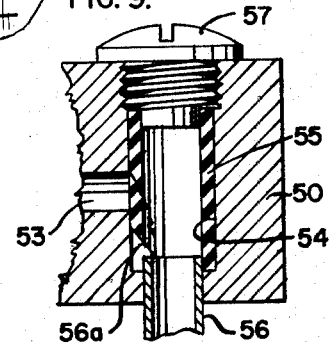

April 13, 1954 — C. R. HOLLIS — 2,674,978
SPOT PASTING MACHINE
Filed Jan. 17, 1952 — 4 Sheets-Sheet 3

Inventor
CLINTON R. HOLLIS
By
Attorney

April 13, 1954  C. R. HOLLIS  2,674,978
SPOT PASTING MACHINE
Filed Jan. 17, 1952  4 Sheets-Sheet 4

Inventor
CLINTON R. HOLLIS
By
Lancaster, Allwine Rommel
Attorneys

Patented Apr. 13, 1954

2,674,978

UNITED STATES PATENT OFFICE 2,674,978

SPOT PASTING MACHINE

Clinton R. Hollis, Savannah, Ga., assignor to Chemical Packaging Corporation, Savannah, Ga., a corporation of Georgia Application January 17, 1952, Serial No. 266,839

12 Claims. (Cl. 118—315)

This invention relates to machines for applying adhesives to materials such as paper, cloth and plastic sheets. An example of such a machine is a spot paster which coats spaced-apart areas of multiple paper webs with paste so they may be pasted together.

The usual way in which spot pasting is done, is to transfer paste, to the paper or material to be pasted, by the use of rotary transfer pads. The pad in its relatively wide movements (usually circular) picks up paste or other adhesive from a roller and, at another point in its movement, it meets the paper or other material and leaves thereon the paste or adhesive it has picked up from the roller, and finally moves along to the roller. In multiple-wall spot pasting employing a plurality of rolls of paper, this method requires considerable space with many paste pans, as well as gears, rollers, and other moving parts. The accumulation of paste on the pads tends to change the amount of paste transferred and, therefore, accurate control of paste transferred is lost. Pasting done by this method sometimes causes considerable difficulty in properly spacing the spots when it is necessary to change the distance between the spots. Moreover, because of the circuitous or complicated movements of the pads it was necessary that the multiple rolls of paper be spaced apart from the tuber considerable distances, thus adding to the area occupied by the machines employing rotary transfer pads. Such machines, too, require a plurality of paste pans, often open mouthed, which collect foreign matter and cause the paste to collect upon the walls of the pans and harden.

An important object of the invention is to provide a spot pasting machine which employs no pads with their complicated movements but, instead, a conduit system, with one reservoir and a plurality of paste-ejecting nozzles. This system is so arranged that space is conserved and the unrolling webs of the rolls of paper can be moved closer together and the rolls themselves may be moved closer to the tuber which folds and seams together the webs of the paper after pasting and with which the new spot paster is associated.

Another important object is to provide a spot paster which dispenses with the use of gears, paste rollers and paste pans and employs no spring-urged plungers for paste ejectors or the like. The new paster herein disclosed utilizes positively-driven plungers adjustable for stroke by one adjustment for all units employed.

A further object of this invention is to provide a spot paster which will paste one or a plurality of unrolling webs of paper or the like.

Yet another important object is to provide a spot paster which will not cause streaking nor material distortion of the spot of adhesive even though the webs of material being pasted are travelling at relatively high speed.

Furthermore, an important object is to provide movable adhesive ejectors or nozzles which move in the same direction and at substantially the same speed as the webs of material being pasted during pasting operations.

Additionally, an important object is to provide a spot paster having adhesive-ejecting means which does not contact the moving webs of material being pasted.

In addition, an important object is to provide, as a part of a spot paster, a novel paste ejector, being free of springs, complicated parts or parts apt to get out of order. The importance of this resides in the fact that a number of said ejectors are employed and functioning failure of even one of the ejectors will be serious.

Other objects and advantages of the invention will be apparent during the course of the following detailed description of the invention, taken in connection with the accompanying drawings forming a part of this disclosure and in which drawings:

Fig. 1 is one side elevation of a fragment of a conventional tuber with the new spot paster connected thereto.

Fig. 2 is a perspective view of the new spot paster in operation and mounted upon a tuber.

Figs. 7 and 8 are transverse sections through an associated adhesive-ejecting means-carrying member and a rocker member, with the same in two positions, the first being the adhesive ejecting position.

Fig. 9 is an enlarged fragmentary vertical section through a portion of the adhesive-ejecting means.

Fig. 12 is a somewhat diagrammatic showing of the course of flow of adhesive when employing two adhesive ejecting means-carrying members.

Fig. 13 is a somewhat like view but showing the course of flow of adhesive when employing three of the members.

Figure 3:
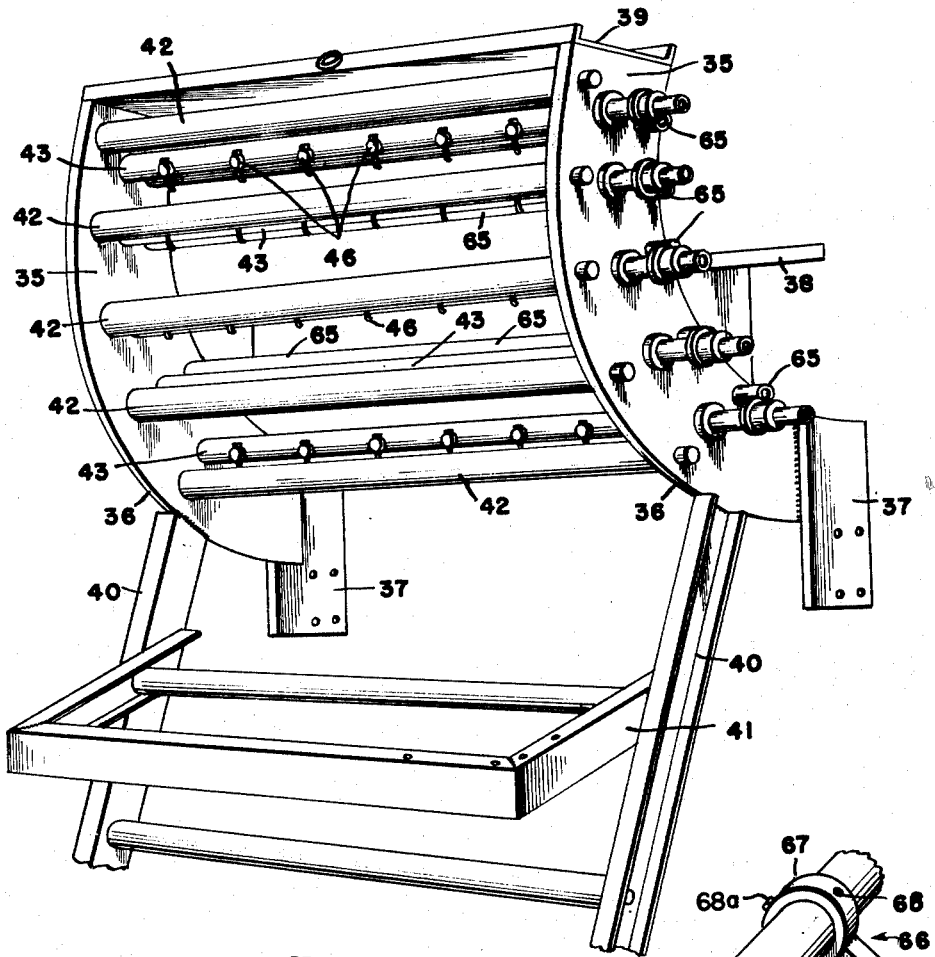
Fig. 3 is a perspective of the new machine removed from the tuber.

In the drawings wherein for the purpose of illustration is shown a preferred embodiment of the invention and wherein similar reference characters designate corresponding parts throughout the several views, the letter A designates a conventional tuber; B, a conventional seam paster; C, the new spot paster; D, means to secure the spot paster C to the tuber A; E, F, G and H, webs of material to be spot pasted; and K, adhesive employed in the spot and seam pasting.

The conventional tuber A is generally employed in conjunction with a bottoming machine (not shown) to make flat single and multiple walled bags such as are generally used by the cement, fertilizer and allied industries. The tuber receives, at its rearward end portion 20, the unrolling webs of material (as heavy paper) E, F, G and H after they have been spot pasted and seam pasted, and this rearward end portion 20 includes a pair of frame side members 21 disposed in spaced-apart parallel relation and a horizontally-disposed support 22 extending rearwardly from the members 21. The members 21 and support 22 may be drilled to receive portions of the means D for rigidly securing the new spot paster C to the tuber A. Associated with the tuber A is a shaft 23, rotatable upon operation of the tuber A and with an end thereof extending outwardly of the forward ends of the side members 21 and one of said ends of the shaft 23 is employed to mount thereon a cam 86 to be subsequently described and which forms a part of the new paster C.

The seam paster B is of conventional construction and includes an adhesive-containing reservoir or pan 30 supporting a plurality of rollers 31, 32 and 33 adapted to form a stripe of adhesive adjacent one like edge of each web E, F, G and H.

Referring now to the new spot paster C, the same includes two spaced-apart parallel side portions or walls 35. These are preferably flat-sided with curved edges including the rearward edges 36, and carry vertically-disposed brackets 37 at their tuber-connected lower ends for securing the paster C to the tuber A. The brackets 37 may have drilled holes for parts of the means D. Intermediate their ends, the walls 35 carry horizontally-disposed brackets 38 for mounting upon the supports 22, employing portions of the means D, since the brackets 38 may be suitably drilled. The upper ends of the walls 35 may be joined by a horizontally-disposed upper wall 39. The walls 35 may be supported also or braced by the legs or braces 40 extending downwardly and rearwardly to the surface upon which the tuber A also rests. The legs 40 may also support a frame 41 upon which the pan 30 is mounted.

Carried by the walls 35 are a plurality of spaced-apart web-contacted, freely-rotating, horizontally-disposed rollers 42 over which the webs E, F, G and H (or any of them) travel. The reduced end portions of the rollers are journalled in suitable openings in the walls 35, and these ends are preferably adjacent the edge 36.

Associated with each roller 42 is an adhesive-ejecting means-carrying rotatable and horizontally-disposed rigid member 43, which is preferably a tube, with its open screw-threaded ends 44 extending outwardly of the outer side faces of the walls 35 and these members 43 are journalled in suitable openings in these walls. Suitable stops 45, as perforated discs, secured to the protruding ends 44 and in abutment with the outer side faces of the walls 35, prevent accidental longitudinal movement of the members 43. The members 43 are spaced inwardly of the rollers 42 but quite closely adjacent them and their alternate rotation is clockwise and counter-clockwise a few degrees, as is apparent by comparing Figs. 7 and 8.

Each member 43 mounts a plurality of spaced-apart adhesive-ejecting means 46 best shown in Figures 7, 8 and 9.

Each adhesive-ejecting means 46 includes an elongated cylinder 47 having a wrench-receiving enlarged end 48 and an exteriorly screw-threaded open end 49. The barrel of the cylinder 47 extends through axially aligned openings in opposite walls of the member 43, with one opening provided with screw threads to cooperate with the screw-threads of the end 49 which also protrudes outwardly beyond the wall of the member 43 and mounts a valve structure 50.

The valve structure 50 includes a housing 51 having a screw-threaded adhesive-receiving bore 52 for the free end portion of the end 49 of the cylinder 47 from which bore 52 extends a small adhesive-receiving passageway 53 which, in turn, opens to a valve member-receiving and adhesive-receiving passageway 54, with its longitudinal axis normal to the axes of the bore 52 and passageway 53, and opening downwardly to exteriorly of the housing 51. This passageway 54 snugly contains a valve member 55 which is a resilient rubber tube, with a part of its outer surface normally in contact with the surface of the passageway 54 and closing the inner mouth of the passageway 53. The tube ends above the lower end of the housing 51 and opens into a discharge way 56 having a permanent bend below the housing to direct its free but preferably contracted open end somewhat toward the adjacent member 43, but its mouth is farther downwardly than is the lowermost part of the adjacent member 43, when the longitudinal axis of the cylinder 47 is horizontal. Below the inner mouth of the passageway 53 and above the lower end of the passageway 54, the tube is cut away diagonally as at 56a to provide a passageway for adhesive to the discharge way 56 only when the tube is distorted. Otherwise the passageway is closed by the resiliency of the walls of the member 55 in contact with the inner surface of the wall of the passageway 54. The upper end of the passageway 54 may be closed by a suitable screw-threaded plug, 57. Intermediate its ends, the cylinder 47 is provided with an adhesive intake port 58.

Figure 5:
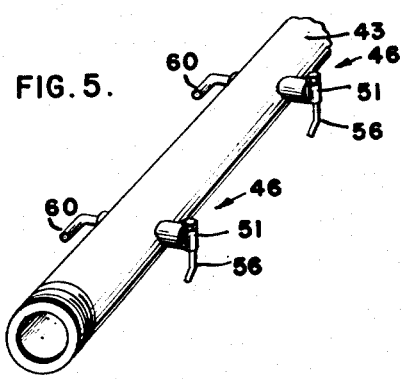
Fig. 5 is a fragmentary perspective of an adhesive-ejecting means-carrying member.
Figure 6:
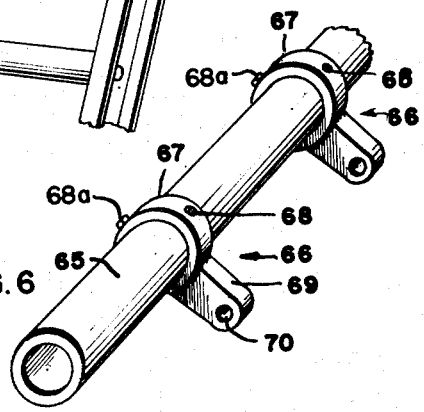
Fig. 6 is a fragmentary perspective of one of the rocker members of Fig. 4 which are associated with members like that shown in Fig. 5.
Figures 4, 10, 11:
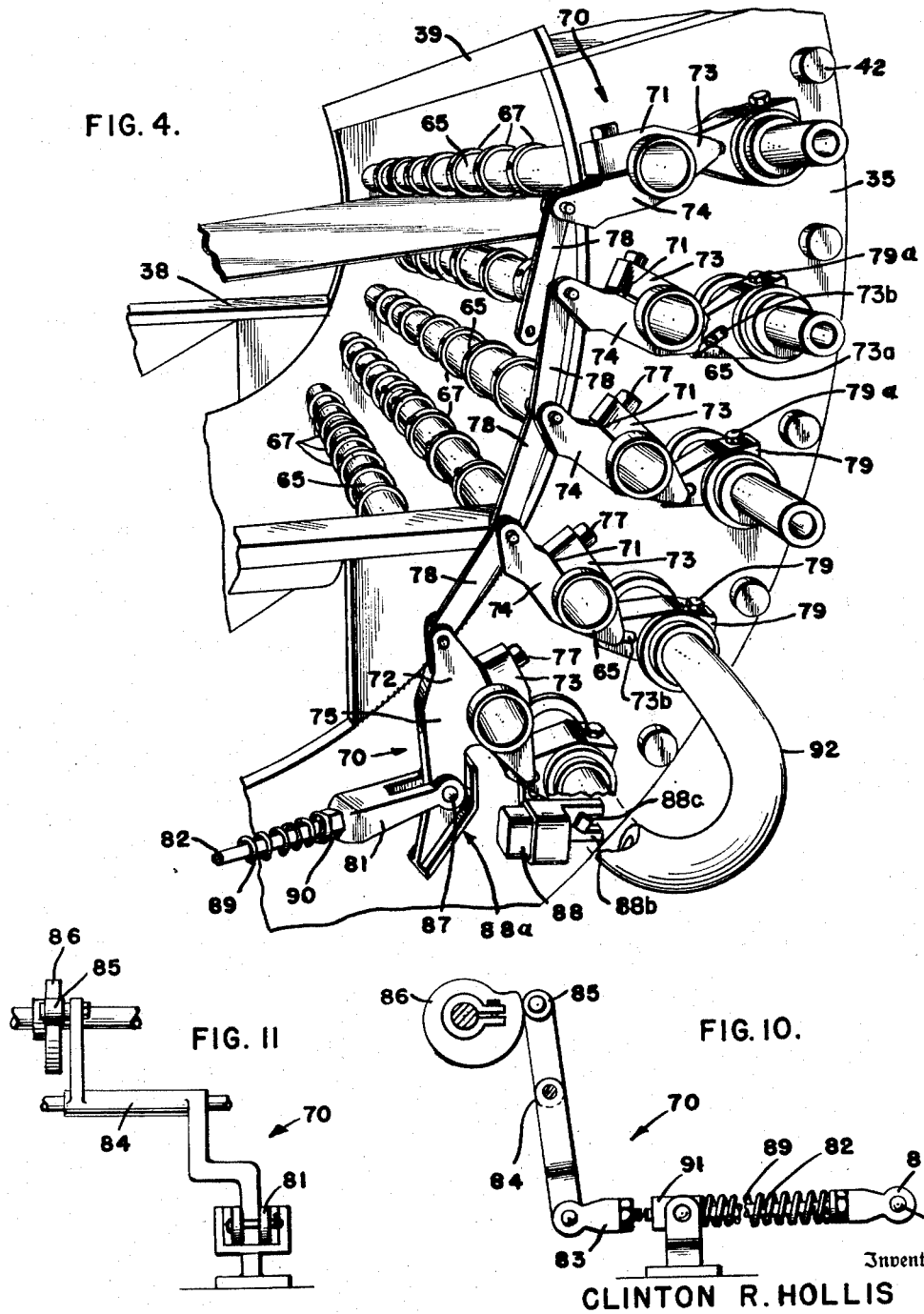
Fig. 4 is an enlarged fragmentary perspective of the major portion of the new spot paster showing actuating mechanism for a plurality of rocker members.
Fig. 10 is a side elevation of a cam and follower assembly for rocking the rocker members.
Fig. 11 is an end elevation of the showing in Fig. 10.

Slidable through the cylinder 47 is a plunger 59. The outer end of the plunger extends outwardly of the enlarged end 48, and its length is such that when extended fully into the cylinder 47, the port 58 is closed by the plunger (as in Fig. 7) but when it is partly retracted (as in Fig. 8) this port is open. The outer end of the plunger 59 has a substantially right angled bend 60 (as in Fig. 5) to form a pivotal connection with structure of an associated rocker member 65 (shown for example in Fig. 6) to be next described.

Each rocker member 65 may be an elongated tube or cylindrical rod journalled in suitable openings in the side walls 35, next adjacent the members 43, and rotating to a limited degree as is clear in Figs. 7 and 8. For each plunger 59 there is provided a connecting means 66 between the plunger and its adjacent rocker member.

Each means 66 may be a ring 67 firmly secured to the rocker arm, in spaced-apart relation, as by screws 68 and 68ª. The screws 68ª removably retain the connecting means 66 in place and the screws 68 are provided to take up any play between the connecting means 66 and rocker members 65. From each ring 67 projects a lug 69 having an opening to receive a bend 60 of a plunger 59.

Means 70 to rock the rocker members 65 (or any selected one or more thereof) and also rock the associated members 43, is best shown in Figs. 1, 4, 10 and 11. Suitably secured to one protruding end of each rocker member 65 is a clamp 71 or 72, having jaws 73 and 74 or 73 and 75 clamped about the member 65 and retained by a screw 77. Each jaw 74 and 75 has a detachable pivotal connection at its elongated end portion with a part of the means 80 to be later described. Each jaw 73 has a loose pivotal connection as by means of a roller 73ª rotatably carried by the jaw and disposed within a slot 73ᵇ in an associated clamp 79 clamped about the end portion of an associated member 43, held in good clamping connection by the screws 79ª. These clamps 79 are inwardly of the screw threads 61 of the members 43. Upon detaching one or more links 78, the rocker members 65, from whose clamp 71 the lever has been detached, will be placed out of operation and, consequently, the members 43 associated therewith will also be inoperative.

Means 80 (being part of the means 70) to cause oscillations of the clamp 72, which is the endmost clamp of the clamps 71 and 72, comprises a forked coupling 81 adjustably connected, as by a screw-threaded connection, with one screw-threaded end of a connecting rod 82 while the other screw-threaded end of the rod carries a like forked coupling 83 pivotally connected with one end of an elbow or crank 84 having a cam follower 85 at its opposite end which rides over the cam face of a rotating cam 86 fixedly mounted upon the shaft 23 of the tuber A to rotate with the shaft. Of course, the forked coupling 81 is pivotally connected as at 87 with the depending end portion of the clamp jaw 75. It will be noted, in Fig. 4, that means may be provided to limit movement of the jaw 75 to the right. This means may be a preferably adjustable bumper or abutment 88 having a slotted bracket portion 88ᵇ secured to the wall 35, as by a screw 88ᶜ, and with the bumper disposed in the path of travel of the adjacent face 88ª of the jaw 75. A suitable expansion helical spring 89 may encircle a portion of the rod 82 bearing against an adjusting nut 90 at one end and bearing against a fixed abutment 91 in the nature of a bearing block for the rod, which abutment 91 may be fixed to the wall 21 as by bolts or screws.

In order to interconnect adjacent open ends 44 of the members 43, it is preferred to provide flexible connecting elements 92 in the form of U-tubes of rubber or the like with their ends fitting over the ends 44.

Means 95 to conduct adhesive K to any selected member 43 from a source of adhesive supply 96 (shown diagrammatically in Fig. 12) may be a flexible rubber tube or conduit 97, with a suitable pump 98 interposed in the conduit 97, simply to cause circulation of the adhesive.

Means 100 to conduct adhesive K from a selected member 43 may be a flexible rubber tube or conduit 101 with one end slipped over the end of the member 43, and which conduit 101 empties into the reservoir or pan of the seam paster B.

With the new spot paster C secured to the tuber A by the means D; the selected number of webs, such as the four webs E, F, G and H of rolls of material (as heavy paper), positioned over the rollers 42 as in Fig. 2, and then fed into the tuber A so they may be carried forwardly upon starting the tuber into operation; the seam paster B mounted upon the frame 41 in its correct position so that the roller 33 will form a stripe of adhesive upon a like edge portion of each web (since each web is set with its edge inwardly of the like edge of the next adjacent web so all may be striped at once); the operator will arrange the U-tube elements 92 as required. For example, in Fig. 12 two members 43 are shown diagrammatically as interconnected with the adhesive supply by means of the one flexible connecting element 92 and the conduits 97 and 101 while in Fig. 13 three members 43 are interconnected. In Fig. 1, it will be appreciated that four members 43 are interconnected. Since but two rocker members will be required to move in order to operate the two members 43 of Fig. 12, the link 78 above the lowermost link 78 will be detached from the lowermost jaw portion 74. The pump 98 may now be set into operation (with the parts of the members 43 and rocker arms 65 as in Fig. 8) and when the adhesive K has circulated, the tuber A may be placed in operation.

Reciprocation of the rod 82 upon relative movements of the cam 86, follower 85 and structure connected therewith and with the rod 82 will cause rocking of the two lowermost rocker members 65.

As the rocker members 65 rock to the position of the one in Fig. 7, the plunger 59 will move forward so that the longitudinal axes of the plunger and its associated lug are substantially parallel, and the force upon the adhesive ahead of the inner end of the plunger will cause the rubber tube valve member 55 to be partly collapsed and a passageway to open, admitting adhesive to the member 55 which will then be ejected from the open lower end of the discharge way 56 and be deposited as a spot upon the web beneath the mouth of the discharge way. As the rocker member 65 then rocks to the position shown in Fig. 8, the travel of the plunger, the longitudinal axis of which and that of the associated lug now converge downwardly toward the adjacent web, will creat a vacuum in front of its free end and cause the tube valve member 55 to resume its original shape. Further travel of the plunger 59 to the left in Fig. 8 will open the port 58 and allow the adhesive (under pressure) to enter the cylinder 47. Obviously, when the port 58 is closed by the plunger, no adhesive can back-flow through the port.

The pump 98 is not depended upon at all for the ejection of the adhesive from the valve structure 50. The extent of rocking of the members 43 carrying the adhesive ejecting means 46 may be varied by adjustments of the rod 82 with respect to the couplings 81 and 83 since the extent of reciprocation of the rod 82 may be varied by the rotation of its ends in the couplings 81 and 83. Obviously cams having cam faces different than that of the cam 86 may be employed as required so that the timing of the reciprocation of the rod 82 may be varied.

It should be noted that travel of the free end portions of the valve member 56 is toward the tuber A when depositing adhesive upon the webs. That is, the members 56 travel in the same direction as the webs.

Providing a resilient, partly collapsible rubber valve member 55 in the form of a cut away tube, positioned as described, makes possible the use of relatively inexpensive valve structures despite the large number which are generally employed in spot pasting. The bend in the discharge way 56 provides an obtuse angular discharge way which extends to direct the discharge adhesive so it will be deposited upon the web as a spot rather than as a streak.

Various changes may be made to the form of the invention herein shown and described without departing from the spirit of the invention or scope of the claims.

What is claimed is:

1. A spot paster for a web of material moving along a path, said spot paster including ejection means to successively eject portions of an adhesive upon said web while said web is moving along said path; and means to oscillate said ejection means about a substantially horizontally-disposed fixed axis in and away from the direction of movement of said web along said path while said ejection means is ejecting said portions.

2. A spot paster according to claim 1 characterized in that said ejection means is spaced from said web in normal movements of said ejection means and while said portions are being ejected.

3. A spot paster according to claim 1 characterized in that said ejection means includes an adhesive discharge way having a discharge port with said ejection means being spaced from said web in normal movements of said ejection means and while said portions are being ejected, and the part of said discharge way adjacent said port is directed toward the direction of movement of said web when said portions are being ejected.

4. A spot paster according to claim 1 characterized in that said ejection means is moved in an alternate arcuate path toward and away from said web and transverse to the longitudinal axis of said web, said path being a portion of a circular path.

5. A spot paster according to claim 1 characterized in that said ejection means is moved in an alternate arcuate path toward and away from said web and wholly transverse to the longitudinal axis of said web.

6. A spot paster for simultaneously depositing a row of spaced apart portions of adhesive transversely across a web of material continuously moving along a path, said spot paster including a plurality of adhesive ejecting nozzles; an elongated rockable member mounting said nozzles in spaced-apart relationship longitudinally of said member, said member being disposed above said web, and means to simultaneously rock said member in one direction on its longitudinal axis and eject adhesive from said nozzles, and to rock said member in the other direction and prevent ejection of adhesive from said nozzles.

7. A spot paster according to claim 6 characterized in that rocking said member in said one direction causes said nozzles to approach said web.

8. A spot paster according to claim 6 characterized in that rocking said member in said one direction causes said nozzles to approach said web and to move in the direction of the path of travel of said web.

9. A spot paster according to claim 6 characterized in that said nozzles have obtuse angular discharge ways.

10. A spot paster according to claim 6 characterized in that said nozzles have obtuse angular discharge ways with their free ends normally directed toward the direction of travel of said web.

11. A spot paster for simultaneously depositing a row of spaced apart portions of adhesive transversely across a web of material continuously moving along a path, said spot paster including a plurality of adhesive ejecting nozzles; an elongated movable member mounting said nozzles in spaced-apart relationship longitudinally of said member; said member being disposed above said web, and being hollow, means to simultaneously rock said member in one direction on its longitudinal axis and eject adhesive from said nozzles, and to rock said member in the other direction and prevent ejection of adhesive from said nozzles including an elongated rocker member with its longitudinal axis substantially paralleling the longitudinal axis of said movable member, a plurality of spaced-apart lugs fixedly carried thereby and projecting radially therefrom, a plurality of spaced-apart barrels, one opening to each nozzle, carried by said movable member and having an intake port in communication with the hollow of said movable member, and a plurality of plungers pivotally connected with said lugs and slidably extending into said barrels and in their forward movements closing said ports and in their rearward movements opening said ports; means to conduct adhesive to the hollow of said movable member; and means to rock said rocker member.

12. A spot paster according to claim 11 characterized in that when said plungers are at the ends of their forward movements the longitudinal axes of said lugs and said plungers are substantially parallel and when said plungers are at the ends of their retracted movements the longitudinal axes of said lugs and said plungers converge toward said web.

References Cited in the file of this patent

UNITED STATES PATENTS

| Number | Name | Date |
|---|---|---|
| 1,184,798 | Ward | May 30, 1916 |
| 1,297,135 | Fricker | Mar. 11, 1919 |
| 1,552,594 | Clarke | Sept. 8, 1925 |
| 1,647,072 | Bergstein | Oct. 25, 1927 |
| 2,319,476 | Ray | May 18, 1943 |
| 2,358,258 | Schweitzer | Sept. 12, 1944 |
| 2,417,546 | De Giers | Mar. 18, 1947 |
| 2,547,884 | Paasche | Apr. 3, 1951 |
| 2,548,456 | Wells | Apr. 10, 1951 |
| 2,586,651 | Herzog | Feb. 19, 1952 |
| 2,587,284 | Brewer et al. | Feb. 26, 1952 |
| 2,602,704 | Richterkessing et al. | July 8, 1952 |
| 2,608,949 | Pasotti | Sept. 2, 1952 |